Jan. 14, 1964   R. GILMONT ETAL   3,117,448
CONDITION INDICATING DEVICE
Filed Aug. 21, 1957   2 Sheets-Sheet 1
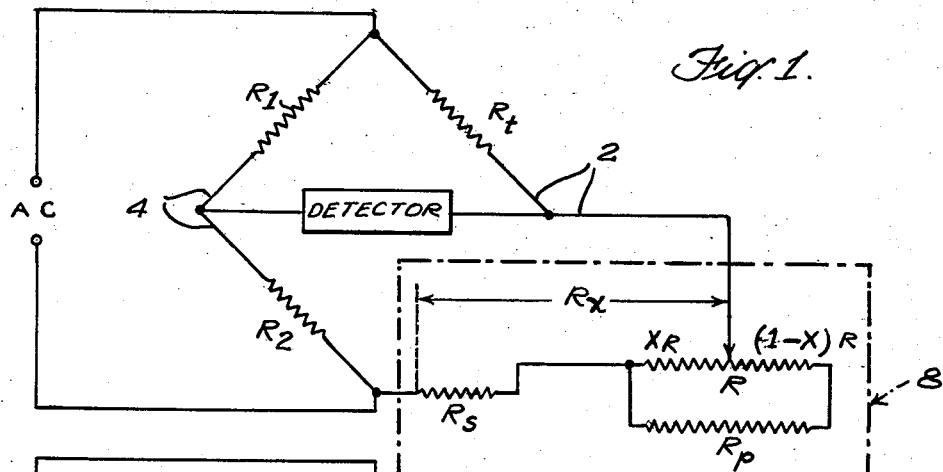
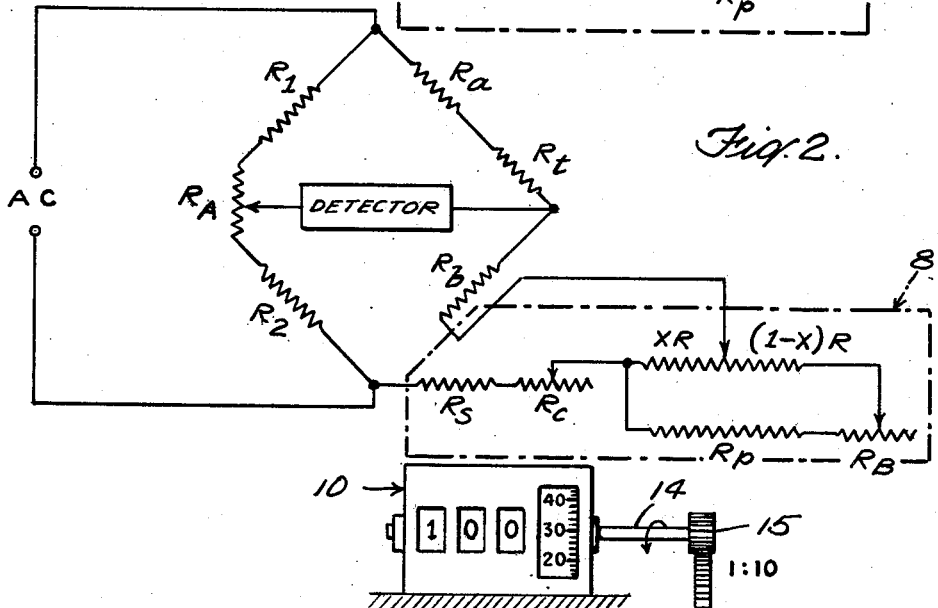
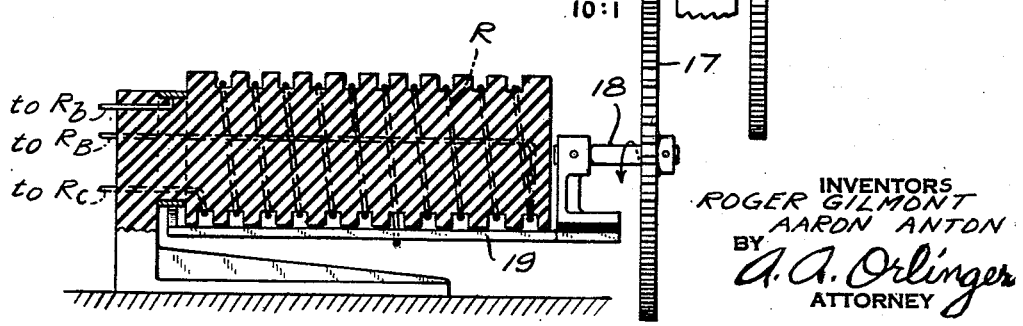
INVENTORS
ROGER GILMONT
AARON ANTON
BY
A. A. Orlinger
ATTORNEY

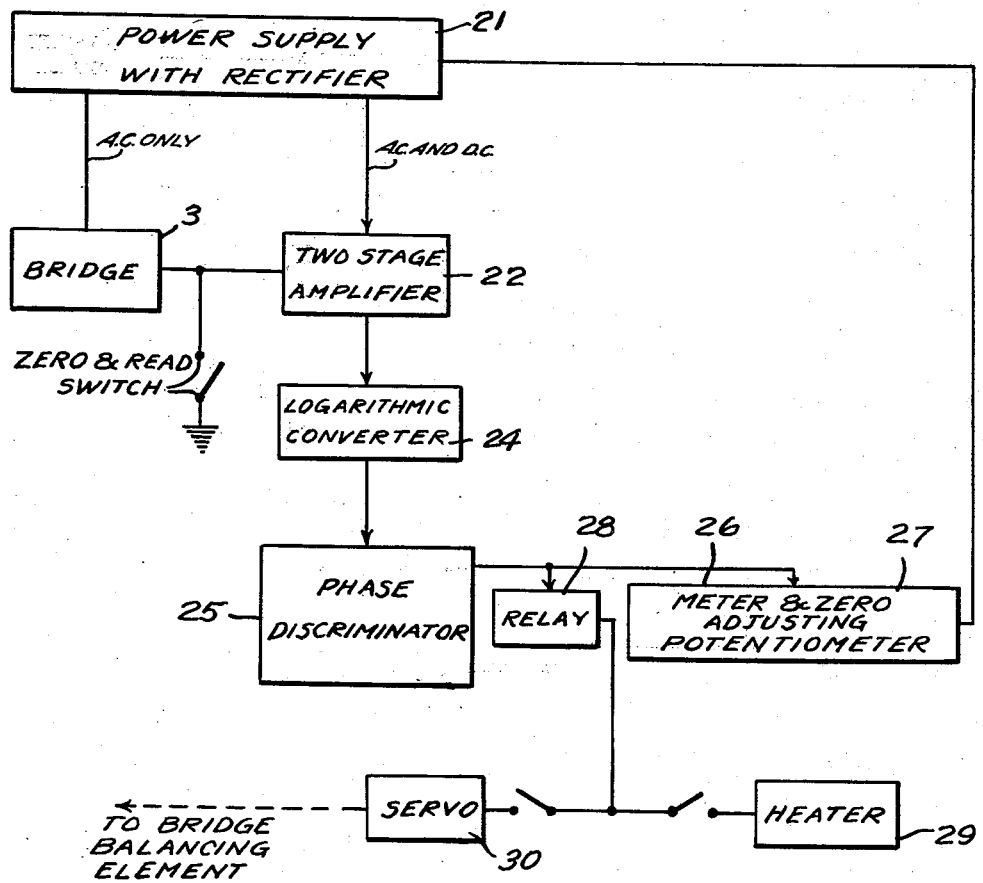

United States Patent Office 3,117,448
Patented Jan. 14, 1964

3,117,448
CONDITION INDICATING DEVICE
Roger Gilmont, Douglaston, N.Y., and Aaron Anton, 428 Edgley Ave., Glenside, Pa.; said Gilmont assignor to Manostat Corporation, New York, N.Y., a corporation of New York
Filed Aug. 21, 1957, Ser. No. 679,400
10 Claims. (Cl. 73—362)

This invention is that of direct-reading, precision temperature indicating devices and particularly of thermometers employing a metallic resistor as a temperature sensor and as one of the operative temperature measuring elements.

Resistance thermometers presently known or in use are cumbersomely burdended by the necessity of carrying out from the observed electrical resistance of the temperature sensing device, extensive and involved time-consuming calculations which are required to convert the resistance value of the temperature sensing element to a specific value directly respresentative of the temperature which determined the resistance of the sensor. Such calculation is necessary because the resistance of the metallic conductor changes generally as a complicated function, for example, with platinum this relationship may be very closely approximated by a second order or quadratic function of its temperature.

The various disadvantages heretofore met are avoided by the resistance thermometers of this invention, which include temperature indicator electrical circuitry that provides a direct indication of temperature by being so arranged that it will respond to a linear input, which is manually or mechanically introduced, in a manner comparable to the second order or quadratic response of the resistance sensor to its ambient temperature.

To this end, the indicator mechanism and sensor are inserted in one branch (i.e. two legs on one side) of a bridge network. Because the temperature indicator circuit includes a meter or counter which is driven by the same input as the non-linear responding elements of the circuit, the indicator can give a direct, visual indication of the input which is required to balance the two above-noted non-linear responsive units of the one branch against the other (linear) branch of the bridge.

The device of this invention also comprises special calibrating elements designed to assure sensitivity of temperature reading on bridge balance, for example, to one hundredth of a degree centigrade over a range of a thousand degrees.

The thermometer is particularly adapted to employ electronic detecting means for precise determination of the point of balance of the bridge network. The electronic detector also is well adapted to control relay circuits for the heater producing the ambient temperature of the sensor and for servo-control of the indicator circuit input so that the input will be automatically stopped when the bridge is balanced and the detector is nulled.

One feature of the invention is the provision of a direct reading resistance thermometer.

Another feature of the invention is a direct reading resistance thermometer operative over a large range of temperature with high accuracy of temperature indication.

Still another feature of this invention is the provision of a direct reading, resistance thermometer of the bridge type which includes, as components of the bridge network, variable linear resistive elements that enable accurate calibration and bridge balancing.

A further feature of the invention is the provision of a direct reading, resistance thermometer of the bridge type, which is peculiarly adapted to employ an electronic detector for the precise determination of bridge balance while the device is being calibrated by means of the special calibrating bridge components and during the normal temperature measuring operation of the device.

Other features of the invention are seen from the following detailed description of certain embodiments of invention in conjunction with the accompanying drawings, in which FIG. 1 is a schematic view of the bridge network including the potentiometer section for demonstrating the core of the invention;

FIG. 2 is the presently preferred circuit arrangement of the invention;

FIG. 3 is a diagrammatic view showing the gear train drive for the temperature reading counter and the potentiometer, and FIG. 4 is a block diagram illustrating the electronic bridge detector and the automatic temperature control and bridge self-balancing means.

The resistance of a thermometer bulb employing a resistive temperature sensing element of a suitable metal is expressed, for example, as a quadratic function of temperature over a given range such as from minus 100° to plus 900° C. within the accuracy desired of the thermometer contemplated by this invention. The relation is expressed as follows:

(1) $$R_t = R_0(1 + at - bt^2)$$

when $R_0$ equals the resistance of the bulb at zero degrees temperature, $a$ equals the linear coefficient, $b$ equals the quadratic coefficient and $t$ equals the temperature in degrees centigrade, where $a$ and $b$ have positive values only.

Thus, the electrical resistance of the temperature sensing element of a temperature bulb obeys a temperature-resistance law which is expressed in the form of a quadratic equation having two coefficients characteristic of the material of the element in the bulb. The temperature responsive resistor of the device of the invention is a metallic element that has a positive linear coefficient and a negative quadratic coefficient, for example, one of the metals platinum, rhenium, zirconium and possibly gold, or alloys of such metals. In the instant device, platinum is preferred because it has best all around characteristics, such as its corrosion resistance even at the maximum temperature, high reproducible electrical resistance, high linear coefficient, and others.

As shown in FIG. 1, the temperature responsive element $R_t$ is one of the resistive components of one branch 2 of a Wheatstone bridge. Branch 4 constitutes the ratio arms of the bridge and includes a resistor $R_1$ and a resistor $R_2$. The measuring arm of the branch 2 of the bridge is a resistive network 8 which is a fundamental component of the temperature indicating system.

The network 8 comprises a resistor $R_s$ connected in series with a potentiometer resistor $R$, and a resistor $R_p$ connected in parallel with the potentiometer R. If XR is the fraction of the potentiometer resistance R at the point of balance, then the resistance $R_x$ of network 8 is equal to the resistance of the series resistor $R_s$ plus the equivalent resistance of the parallel paths which include the resistance XR and the resistance $R_p$ plus $(1-X)R$.

It can easily be demonstrated that the following equation obtains for the network resistance:

(2) $$R_x = R_s + XR - \left(\frac{R^2}{R_p + R}\right)X^2$$

Equation 2 contains a linear and quadratic expression, just as does the temperature-resistance Equation 1 above. Thus, it is seen that if the thermometer coefficients, $R_0$, $a$ and $b$, which depend on the properties of the metallic resistor provided in the bulb, and the ice point resistance of this metal resistor, are respectively equated to the network coefficients $R_s$, $R$, and $$\frac{R^2}{R_p+R}$$

then the change of the thermometer resistance $R_t$ with change in temperature, and the change in the equivalent resistance of the network with the change in input X required to balance the bridge, will be in the same ratio and the input X will be directly and linearly related to the ambient temperature of the sensing resistor $R_t$.

In the preferred embodiment of the invention (shown in FIG. 2), the temperature sensing resistor $R_t$ has lead resistors $R_a$ and $R_b$ which compensate for any difference in resistance in the leads so as to assure that the principal components in each branch are in the same ratio at bridge balance; and trimmers are provided to set conditions so that the values of R, $R_s$, and $R_p$ are selected so that the network coefficients are equal to their respective thermometer coefficients of the thermometer bulb.

When a suitable metal, such as platinum, is used as the temperature sensing element in the bulb, it can be shown that R, $R_s$, and $R_p$ have the following values (for $t$ equal to minus 100° C. at X equal to zero, and $t$ equal to 900° C. at X equal to one):

(3) $$R = R_0(a+200b)1{,}000\frac{R_2}{R_1}$$

(4) $$R_s = \frac{(1-100a-10{,}000b)}{(a+200b)1000}R$$

(5) $$R_p = \left(\frac{a}{1000b} - \frac{4}{5}\right)R$$

Actually, R is selected as close as possible to the desired value, and the ratio of the bridge is adjusted to compensate for the small difference, thus:

(6) $$r = \frac{R_2}{R_1} = \frac{R}{R_0(a+200b)1000}$$

The bridge ratio $r$ is adjusted by means of trimmer $R_A$ inserted between the resistors $R_1$ and $R_2$; the value of the resistor $R_s$ is adjusted by trimmer $R_C$ in series therewith, and $R_p$ is adjusted by the trimmer $R_B$. To make these adjustments it is necessary to calibrate the instrument at three different temperatures. Three temperatures are needed because three independent parameters must be satisfied. The three trimmers do not act independently. Thus, a desirable advantage of the invention is in the below described calibration procedure which requires a minimum of adjustments.

In selecting the bridge components $r$, $R_s$, and $R_p$ it is seen that $$\frac{r}{R}$$

depends upon all three coefficients $R_0$, $a$ and $b$;

$$\frac{R_s}{R}$$

depends upon $a$ and $b$; whereas $$\frac{R_p}{R}$$

depends only on the ratio of $a$ to $b$. From the circuit design, it is apparent that the trimmer $R_B$ should be adjusted at as high a temperature reading as possible; at low temperatures it has little effect upon the balance of the bridge. In fact, at $t=-100$ ($X=0$), it has no effect. Using these relationships as a basis, the calibration procedure was devised with need for a minimum number of adjustments. Selecting three temperatures 0° C., 100° C. and 400° C., this procedure is described for bulb thermometers of a metal such as platinum, as follows:

A network counter, which is described below, is set to read 100° C. by the input for the potentiometer R. The temperature bulb is then placed in a medium which has a temperature of 100° C. (e.g. boiling point of water), and the bridge is brought into balance by means of trimmer $R_A$. Secondly, the bulb is placed in a medium of 0° C. (e.g. the ice point) and the counter is adjusted to balance, at which point it reads $v$. With the bulb still at the ice point, the trimmer $R_A$ is now adjusted to balance the bridge while the counter is set to read $w$, where $w$ equals 3.52$v$; and then the bridge is balanced by the trimmer $R_C$ while the counter is set to read zero. Thirdly, the bulb is placed in a medium at 400° C. and the bridge is balanced, at which point the counter reads 400 plus $x$. With the bulb still at 400° C., the bridge then is balanced by trimmer $R_A$ while the counter is set to read 400 plus $y$, where $y$ equals 2.64$x$, and then by trimmer $R_C$ while the counter is set to read 400 plus $z$, where $z$ equals 2.00$x$. With the bulb still at 400° C. and with the counter set to read 400, the bridge is finally balanced by the trimmer $R_B$. At the conclusion of these adjustments, assuming R was initially selected sufficiently close to the desired value, the three parameters for the bridge components $R_s$ and $R_p$ and the bridge ratio $r$ will have been established.

The foregoing numerical relationships between $v$, $w$, $x$, $y$, and $z$ apply when in Equation 1 above, $R_0$ equals 24.42, $a$ equals 0.003978, and $b$ equals 0.586 times ten to the minus sixth. The latter two values (i.e. $a$ and $b$) are the average values for the coefficients for pure platinum metal as the sensing element. $R_0$ was selected as near 25 as possible to utilize a convenient value for R.

The first two stages of the calibration were performed at the relatively low temperatures of 0° and 100° C. while the third stage was performed at 400° C. Obviously, there is nothing critical about the actual temperatures for the low and high temperature calibration; and, in fact, if higher accuracy is desired, especially for high temperature measurement, it is recommended that the high temperature calibration stage be modified by employing a higher calibration temperature than 400° C.

As shown in FIG. 3, the network temperature direct reading counter 10 is driven by an input shaft 11, on which there are mounted gears 12 and 13. The counter operating shaft 14 is in driven engagement with shaft 11 through gear 15 which is in mesh with gear 12. The gears 12 and 15 are in a 10 to 1 ratio.

The potentiometer R is mounted also to be driven by input shaft 11 through gear 13 on shaft 11 and in mesh with the gear 17 on the potentiometer shaft 18. The gears 13 and 17 are in a 1 to 10 ratio, so that for every 100 turns of input shaft 11, the counter shaft 14 has been driven a thousand revolutions and the potentiometer shaft has been given 10 revolutions. Thus, by means of this gearing expedient, the input shaft need only be turned one hundred times to drive the counter from zero to a thousand, and the gear ratios required are not substantial.

Temperature is indicated digitally with the first three digits displayed on separate wheels respectively of a counter, and the fourth and fifth digits indicated on its last wheel (i.e. a fourth wheel). The smallest division on this last counter wheel corresponds to 0.02° C., and is easily readable to one half of a division. Temperatures in the range of zero to 900° C. are therefore shown directly on this four wheel counter and are readable to 0.01° C. Temperatures from zero to minus 100° C. are indicated on the counter in retrograde (i.e., to get actual temperature reading in that lower range, the digital counter reading is subtracted from 1000.00° C., and the result is the actual temperature below zero).

The potentiometer R is of the multiple turn continuous slide wire type, having a bar 19 rotated concentrically about the circumference of its core and picking up a turn of the resistance coil as the bar is driven by the arm connected to shaft 18. Because the bar thus makes continuous contact with the entire length of the coil, the potentiometer affords infinite resolution.

As previously mentioned, the bridge is preferably provided with an electronic detector for determining its state of balance. As shown in FIG. 4, the bridge is energized by means of the power supply 21, which has been carefully shielded, thereby enabling the output level or amplifications of the bridge to be increased. The bridge voltage is internationally made so low that there is virtually no self-heating in the thermometer bulb (the temperature sensing means $R_t$). The output of the bridge is then fed through a zero and read switch in open position to a two-stage amplifier 22, the plate voltage of which are provided by the rectifier which is associated with and draws from the power supply 21.

The output of amplifier 22 then is run into a logarithmic varistor (i.e., a resistor whose resistance increases with voltage) converter 24 which controls the input from the amplifier to the grid of a dual triode phase discriminator 25 and thereby protects the meter from overload. The discriminator 25 determines the direction of the deviation from the null point, i.e. whether the reading is above or below the balance point. Disposed across the plates of this phase discriminator is a bridge meter 26 which is equipped with a zero adjustment potentiometer energized by the rectifier (associated with power supply 21). The zero adjusting potentiometer is provided in order to adjust the meter to a zero position when the power is on and the bridge output is shunted to ground by closing the zero and read switch.

In using the electronic resistance thermometer of the invention to measure the precise temperature of a medium within the set operating range of the device, after the device had been calibrated, the temperature sensing means is contacted with the medium whose temperature is to be read; and all that then needs to be done is to rotate shaft 11 until the detector shows that the bridge is in balance. The reading on the counter 10 then is the temperature of the medium (if the medium is at above 0° C.).

If desired, an electric relay 28 may also be placed across the output of the phase discriminator. Such relay can be switched in to control the circuit of the heater 29 in the bulb bath or medium, to permit automatic temperature control so as to make it possible, by means of the input shaft 11, to set the temperature of the medium surrounding the bulb. Alternatively, the relay may switch into the circuit of a servo-motor 30, which is connected to drive input shaft 11, and effect automatic self-balancing of the bridge for a given bulb temperature.

Various modifications of the resistance thermometer may be effected by those skilled in the art without departing from the scope and principle of the invention as defined in the appended claims which are intended also to embrace equivalents of the illustrative embodiments specifically described herein.

What is claimed is:

1. A resistance thermometer comprising in an electric circuit a comparison bridge circuit in one branch of which there is provided a resistance bulb thermometer whose resistance is a quadratic function of temperature and in which the constant and the linear coefficient are positive and the quadratic coefficient is negative; and a quadratic resistance network in another branch of the bridge and composed only of electrical elements whose resistance is linear with length and including a resistor in series with two other resistors that are in parallel to one another, and with a variable tap on one of the two parallel resistors.

2. A resistance thermometer as defined in claim 1, wherein a variable resistance trimmer is provided in one of the branches of said comparison circuit.

3. A resistance thermometer comprising in an electric circuit a comparison circuit including a resistance ratio establishing branch and a temperature sensing branch; a variable resistance trimmer in said resistance ratio branch; a quadratic resistance network in said temperature sensing branch, said network being composed only of electrical elements whose resistance is linear with length and including a resistor in series with two other resistors that are in parallel to one another; a resistance bulb thermometer, whose resistance is a quadratic function of temperature and in which the constant and the linear coefficient are positive and the quadratic coefficient is negative; disposed in the temperature sensing branch; one of said parallel resistors having a pick-off element connected to said bulb thermometers; and an electronic detector placed across said comparison circuit.

4. A resistance thermometer as defined in claim 3, wherein in the quadratic resistance network a variable resistance trimmer is connected to the resistor which is in series with the two other resistors that are in parallel to one another; and a separate variable resistance trimmer is connected to that resistor of the two which are in parallel to one another, other than the one having a pick-off element connected to the bulb thermometer.

5. A resistance thermometer as claimed in claim 4, wherein said parallel resistor having said pick-off element is a potentiometer having said resistor in the form of a winding adapted to be contacted by the pick-off element; and said element is a rotatable bar adapted to be in continuous connection with the potentiometer winding and thereby afford infinite resolution to said potentiometer; and there is provided a digital, temperature reading counter; and, disposed in driving relationship with said counter and said rotatable bar, a power input means which is in stepped-down gear ratio connection with said rotatable bar and in stepped-up gear ratio connection with said counter.

6. A resistance thermometer as claimed in claim 4, wherein the temperature responsive resistance element of said bulb thermometer is made of platinum.

7. A resistance thermometer as claimed in claim 4, wherein a relay circuit is connected to said electronic detector and a servo-motor is selectively connected to said relay circuit and is disposed in driving relation to the pick-off element connected to said thermometer, whereby said resistance thermometer is adapted to be automatically self-balancing.

8. A resistance thermometer as claimed in claim 4, wherein a relay circuit is selectively connected to said electronic detector and a heater for supplying heat to said bulb thermometer is in operative connection with said relay circuit, whereby there is provided means for pre-selecting the temperature of said bulb thermometer.

9. A resistance thermometer comprising in an electric circuit a temperature sensing means which depends on its electrical resistance for its operation and whose resistance is a quadratic function of temperature and in which the constant and the linear coefficient are positive and the quadratic coefficient is negative; a resistance network composed only of electrical elements whose resistance is linear with length and which network has terminal properties which yield the same quadratic function at at least one of its said elements; variable resistance means electrically connected to and adapted to adjust said network until its said function is proportional to the said temperature sensing means; said temperature sensing means and said network being cooperatively combined in electrical connection in a comparison and current indicating circuit, wherein the variation of the parameter or parameters of at least one of said elements in said network is linearly proportional to the change in temperature of the temperature sensing means thereby to maintain the proportionality of the said quadratic functions, the non-linearity being cancelled out in the comparison net work so that the current indicating circuit is adapted to yield a direct reading of temperature.

10. A resistance thermometer comprising in an electric circuit a comparison bridge circuit in one branch of which there is provided a resistance bulb thermometer whose resistance is a quadratic function of temperature and in which the constant and the linear coefficient are positive and the quadratic coefficient is negative; and a quadratic resistance network in another branch of the bridge and composed only of electrical elements whose resistance is linear with length and including a resistor connected in series separately with each one of two other resistors which are in parallel to one another, with a variable tap on one of these two parallel resistors; and a separate variable resistance trimmer is connected in series with each one respectively of the other two resistors, whereby the parameters of said network may be adjusted according to the temperature coefficients of said bulb.

References Cited in the file of this patent

UNITED STATES PATENTS

| | | |
|---|---|---|
| 950,513 | Northrup | Mar. 1, 1910 |
| 1,573,850 | Naiman | Feb. 23, 1926 |
| 1,776,901 | Essex et al. | Sept. 30, 1930 |
| 2,541,857 | Besselman et al. | Feb. 13, 1951 |
| 2,649,715 | Goble | Aug. 25, 1953 |
| 2,653,308 | Allen | Sept. 22, 1953 |
| 2,659,234 | Harrison | Nov. 17, 1953 |
| 2,799,758 | Hutchins | July 16, 1957 |
| 2,800,015 | Shaw | July 23, 1957 |

OTHER REFERENCES

Beakley, J. Scientific Instruments, vol. 28, No. 6, June 1951, pp. 176–179.